Patented May 25, 1926.

1,586,129

UNITED STATES PATENT OFFICE.

HANS THIELE, OF NIEDER-INGELHEIM-ON-THE-RHINE, GERMANY, ASSIGNOR TO C. H. BOEHRINGER SOHN, OF NIEDER-INGELHEIM-ON-THE-RHINE, A GERMAN SOCIETY.

GELATINE FOOD.

No Drawing.    Application filed July 13, 1925. Serial No. 43,394.

The usual acid additives to gelatine foods for purposes of improving their flavor consists usually of tartaric acid or acetic acid. Other constituents used in the case of fruit gelatine foods, are for instance natural or artificial fruit juices, ethereal oils, such as lemon oil and the like, and sugar or other sweet substances, while in the case of meat gelatine preparations, substances such as meat extract, Maggi bouillon and the like are added.

According to the invention in making gelatine foods or the means for preparing them acid lactate of lime is used as the acid constituent or as one of the constituents.

Preferably the acid lactate of lime is used in combination with neutral lactate of lime. In place of, or in addition to acid lactate of lime, a solid solution of lactic acid in lactate of lime or in acid lactate of lime or in both may be used. It was not to be foreseen that lactate of lime could be used for this purpose. It would on the contrary be expected that the presence of lactate of lime in the requisite quantities would interfere with the gelling capacity of the gelatine in manufacturing the foods or that it would cause turbidity. It is a surprising fact that such or similar effects do not appear. It has on the contrary been found that the gelatine preparations made with the aid of lactate of lime are eminently suitable for working up into gelatine foods and that in particular the watery preparations stiffen when only slightly cooled, the products formed being clear and of excellent flavour.

The use of acid lactate of lime or of lactic acid absorbed in lactate of lime or acid lactate of lime for preparations for the manufacture of gelatine foods provides advantages in various directions. The acids usually employed, such as tartaric or lemon acid, which are foreign to the human body, are replaced by lactic acid which, occurs in the human body and is therefore more wholesome. It is also cheaper. The therapeutically very valuable lactate of lime is introduced imperceptibly into the body through the agency of the gelatine preparations of the present invention.

The sweet foods, bouillon brawns and the like manufactured by means of the gelatine preparations of the present invention have not only the advantage of being refreshing and pleasant to the palate, but they introduce the lime imperceptibly into the body. This is valuable for the building up of the body.

Besides acid lactate of lime or lactic acid absorbed in neutral or acid lactate of lime, substances may also be present, such as are usually employed in the manufacture of gelatine foods for instance fruit juices, wine, tartaric acid, lemon acid, ethereal oils, sugar and other sweet substances, meat extract and the like. The means for preparing the gelatine foods may be made in the usual forms, for instance powder form or solid form, preferably in the shape of briquettes, for instance in cube form. The gelatine foods are prepared in the usual manner by the preparations with or without additional substances being dissolved by being mixed with water and heated and by the aqueous solution being thereupon allowed to stiffen through cooling.

For manufacturing the preparations lactic acid, which is free from anhydride is preferably used.

A composition of matter for the manufacture of fruit gelatine foods may for instance have the following composition: 8.7 grms. acid lactate of lime, 5.6 grms. neutral lactate of lime, 12.0 grms. gelatine, 73.6 grms. sugar, 0.05 grms. colouring matter, 0.05 grms. lemon oil.

A composition of matter for the manufacture of meat extract foods may for instance have the following composition: 6 grms. acid lactate of lime, 7 grms. neutral lactate of lime, 12 grms. gelatine, 8 grms. meat extract.

As will be clear to those skilled in the art, the composition of matter above described and claimed, may contain ingredients usually employed in the manufacture of gelatine foods in addition to the gelatine and lactic acid compounds such as acid lactate salt, for example acid lactate of lime, or the neutral lactate salt such as the neutral lactate of lime or lactic acid or combinations of these lactic acid compounds as set forth in the claims.

Claims:

1. Composition of matter for the manufacture of gelatine foods, characterised by their containing gelatine and acid lactate of lime, as set forth.

2. Composition of matter for the manufacture of gelatine foods, containing gelatine, lactate of lime, and lactic acid, as set forth.

3. Composition of matter for the manufacture of gelatine foods containing gelatine, acid lactate of lime and lactic acid.

4. Composition of matter for the manufacture of gelatine foods, containing gelatine, acid lactate of lime, neutral lactate of lime and lactic acid.

5. Composition of matter for the manufacture of gelatine foods, comprising in combination gelatine and lactic acid which has been absorbed in a calcium salt of lactic acid.

6. Composition of matter for the manufacture of gelatine foods, comprising in combination gelatine, and lactic acid free from anhydride, which has been absorbed in a calcium salt of lactic acid.

In testimony whereof I affix my signature.

Dr. Ing. HANS THIELE.